United States Patent [19]

Stahl

[11] Patent Number: 4,801,122

[45] Date of Patent: Jan. 31, 1989

[54] ISOLATOR FOR SEISMIC ACTIVITY

[76] Inventor: James M. Stahl, 4049 Irving Pl., Culver City, Calif. 90232

[21] Appl. No.: 152,767

[22] Filed: Feb. 5, 1988

[51] Int. Cl.⁴ ............................................. F16M 13/00
[52] U.S. Cl. ...................................... 248/636; 52/167; 248/564; 248/584
[58] Field of Search .............. 248/562, 564, 636, 584, 248/421, 638, 580, 581; 52/167; 108/136

[56] References Cited

U.S. PATENT DOCUMENTS

| | | | |
|---|---|---|---|
| 3,266,759 | 8/1966 | Allen | 248/580 |
| 3,908,940 | 9/1975 | Van Der | 108/136 X |
| 4,101,102 | 7/1978 | Lloyd | 248/638 |
| 4,330,103 | 5/1982 | Thuries | 52/167 X |
| 4,371,143 | 2/1983 | Ishida | 52/167 X |
| 4,402,483 | 9/1983 | Kurabayashi | 248/636 |
| 4,565,039 | 1/1986 | Oguro | 248/636 X |
| 4,577,826 | 3/1986 | Bergstrom | 248/638 |
| 4,596,373 | 6/1986 | Omi | 248/636 X |
| 4,662,133 | 5/1987 | Kondo | 248/636 X |

Primary Examiner—J. Franklin Foss
Attorney, Agent, or Firm—George J. Netter

[57] ABSTRACT

An apparatus for supporting an object on a base for isolating the object from movement of the base, typically an art object, instrument, case, or housing for projection during seismic activity. The apparatus includes a base plate for attachment to the base, with a frame positioned on the base plate and adapted for omni-directional movement over the base plate. A lever is pivotally mounted on the frame and is connected to a spring, typically by a cable. The lever is also connected to the base plate, typically by another cable, with movement of the base plate moving the lever and extending the spring, after which the spring retracts, restoring the apparatus to the rest position.

10 Claims, 3 Drawing Sheets

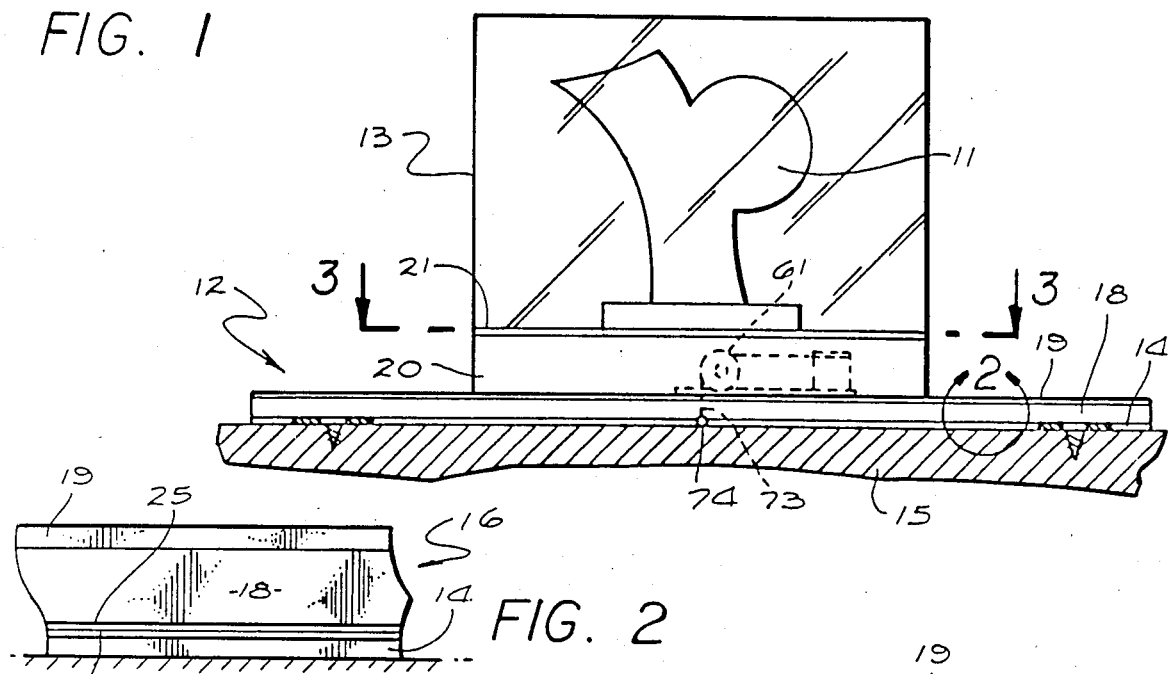
FIG. 1
FIG. 2
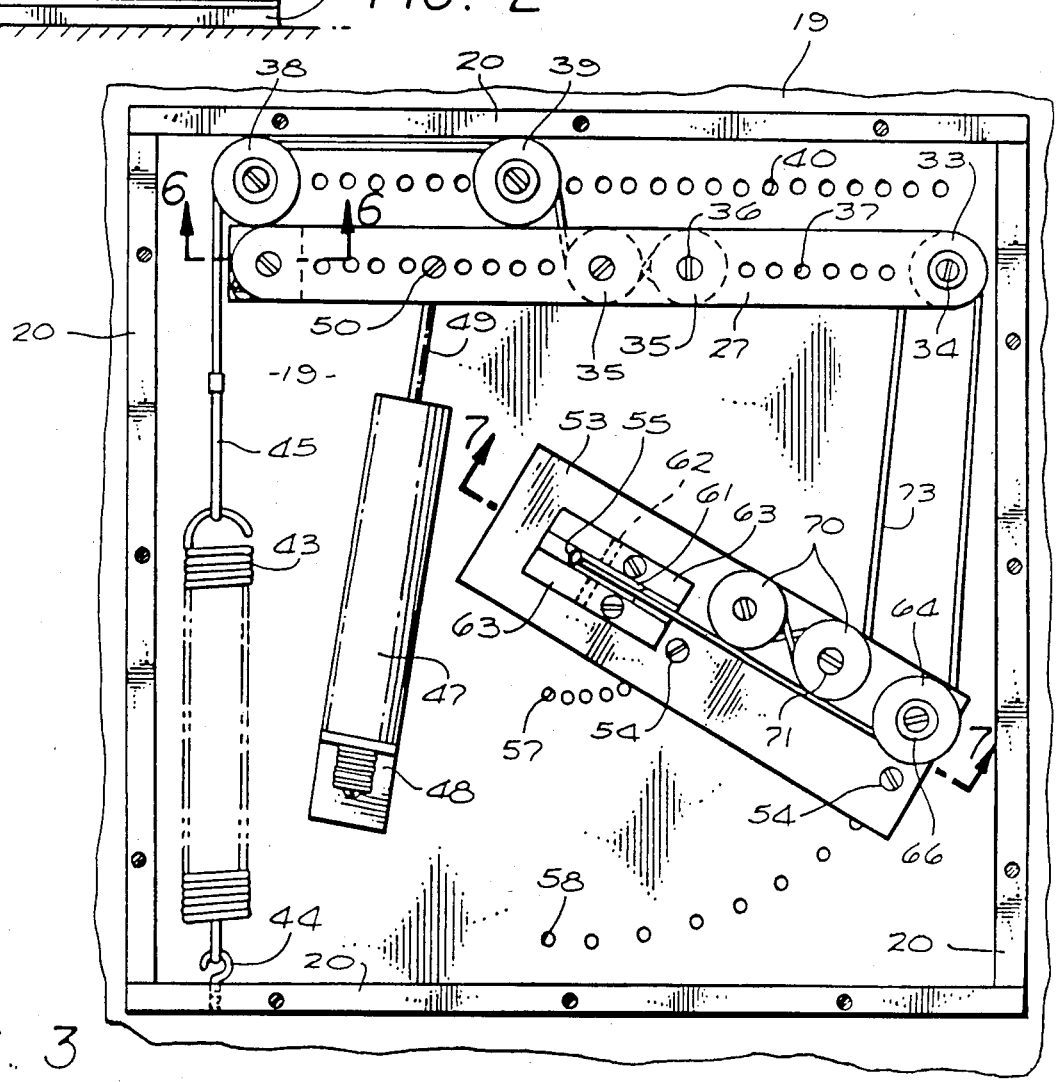
FIG. 3

ISOLATOR FOR SEISMIC ACTIVITY

BACKGROUND OF THE INVENTION

This invention relates to protection from shock and vibration, and in particular, to apparatus for protection of objects from damage resulting from seismic activity such as earthquakes. The invention is of particular significance to the protection of art objects and antiquities of museum quality and to the protection of display cabinets and contents; however, the invention is also applicable to protection of other objects such as scientific and medical instruments and other sensitive equipment, emergency equipment of all kinds, computers and computer files, housings and enclosures, floors and even entire buildings.

A wide variety of configurations have been utilized in the past for protection from damage due to earthquake. In one approach, the structure is designed to be exceedingly strong so that the structure and its support, such as a single object or an entire building, moves with the earth movement without damage. Another approach has been to support the object on some type of apparatus so that the object remains essentially fixed while the earth moves, with the object ultimately being restored to its original relationship with the earth. Structures of this general nature are shown in U.S. Pat. No. 4,496,130 and Italian Pat. No. 639,666. In one arrangement, a bowl and caster configuration is utilized to permit relative motion, with gravity or a spring providing the restoring force. Another approach utilizes a plurality of springs for suspending the object, with the springs providing isolation between the object and the earth movement.

Another approach has been to utilize cables and springs for controlling motion, and typical structures are shown in U.S. Pat. Nos. 4,371,143; 4,402,483; 4,565,039; 4,577,826, 4,617,769; and 4,662,133. While these designs have been satisfactory for some situations, problems are encountered in other arrangements and it is an object of the present invention to provide a new and improved isolator construction.

SUMMARY OF THE INVENTION

It is an object of the present invention to provide a new and improved apparatus for supporting an object on a base for isolating the object from movement of the base, typically movement resulting from seismic activity. Another object of the invention is to provide such apparatus which is suitable for use with individual art objects, with display cabinets and the like, and with entire housing structures.

In comparison with existing seismic isolators, the isolator of the present invention allows for a great deal of horizontal displacement in a compact low profile package. Other advantages of this isolator are that it is very inexpensive and simple to manufacture. It is easily adjustable to a wide range of loads and then easily readjusted without the addition of extra parts or accessories, to a different load. Not only is the spring load adjustable but the dynamics of the curve of the spring load also are adjustable and also without the addition of extra parts and/or accessories. The seismic isolator of the present invention is held in place by constant spring tension so needs no shear pin or catch to hold it during times of non seismic activity. The isolator can be used independently for a single object such as an art object or a piece of sensitive equipment, or in groups as big in number as could be desired, for an entire container, room, floor or building isolation.

These and other objects, advantages, features and results will more fully appear in the course of the following description.

The presently preferred embodiment of the invention incorporates a base plate for attachment to a base such as a floor or a building or an earth foundation, and a frame which is positioned on the base plate for omni-directional movement of the frame over the base plate. The object to be protected is carried on the frame, and the isolator mechanism is incorporated in the frame and connected to the base plate by a connector such as a cable. A moving member, typically a pivoted lever, is connected to a spring carried in the frame by a connector means such as a cable, and the lever is also connected to the base plate by another connector means, typically another cable. During a seismic event, the base plate moves with the earth while the inertia of the object resists motion, with the cable between the lever and the base plate causing the lever to pivot and extend the spring. After the spring has been extended, the restoring force of the spring pivots the lever in the opposite direction moving the frame and object to the new earth location. The cable interconnection between the frame and the base plate is at a single point, with the apparatus providing for omni-directional movement, a significant factor in any seismic protection apparatus.

BRIEF DESCRIPTION OF THE DRAWINGS

FIG. 1 is a side view showing an isolator in the rest position and incorporating the presently preferred embodiment of the invention;

FIG. 2 is an enlarged partial view of a portion of FIG. 1 indicated at 2;

FIG. 3 is an enlarged sectional view taken along the line 3—3 of FIG. 1;

DESCRIPTION OF THE PREFERRED EMBODIMENTS

Figure 4:
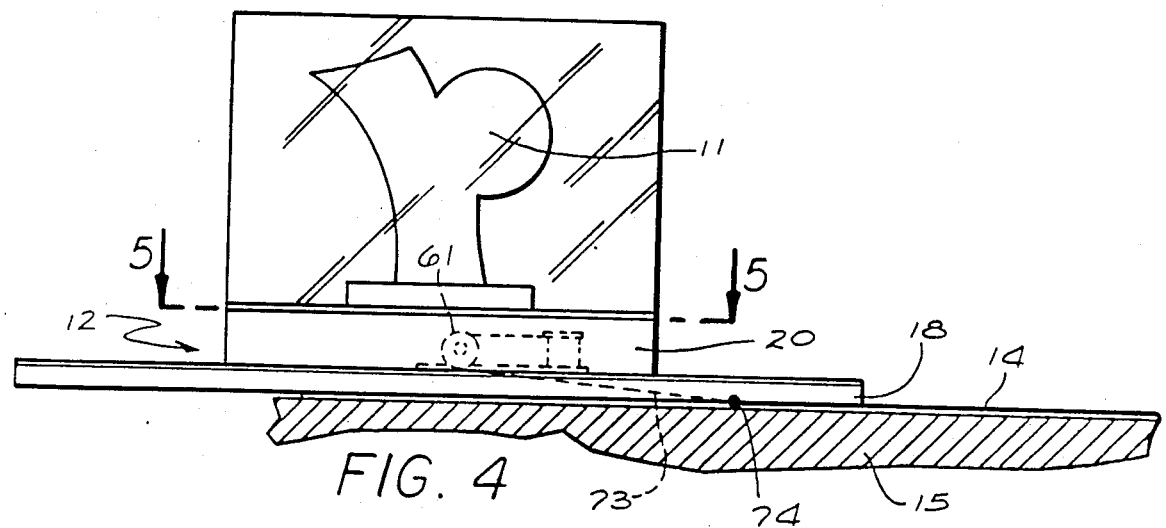
FIG. 4 is a view similar to that of FIG. 1, showing the isolator after movement of the earth relative to the object.

Referring to FIGS. 1-3, an object 11 is mounted on an isolator apparatus 12, with the object optionally being covered by a protective transparent enclosure 13. The isolator 12 includes a base plate 14 which is attached to a support base 15, typically a floor of a room. A frame indicated generally at 16 rests on the base plate 14 and in the embodiment illustrated includes a wood sheet 18, an aluminum sheet 19, side members 20, and a cover 21. The members of the frame are joined together by conventional means, such as screws, and the object 11 is fixed to the top sheet 21.

The base plate 14 and the lowest portion of the frame 16, here the wood sheet 18, have interengaging means which permit omni-directional movement of the frame over the base plate. In the specific embodiment illustrated, this comprises a sheet 24 of teflon or similar slick material fixed to the top of the base plate 14, and another sheet 25 of similar material fixed to the bottom of the frame. With this arrangement, the frame readily moves in any direction over the base plate. It will readily be seen that other types of structures can be utilized to provide the interengaging means, such as spherical balls or other means of providing a low coefficient of friction.

Figure 6:
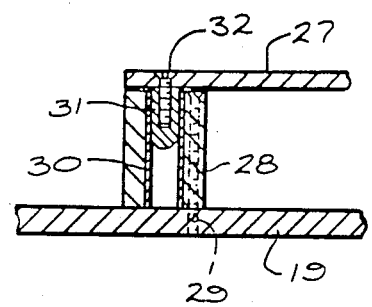
FIG. 6 is an enlarged partial sectional view taken along the line 6—6 of FIG. 3.

A moving member such as a lever 27 is mounted on the sheet 19, and one mounting arrangement is shown in greater detail in FIG. 6. A post 28 is attached to the sheet 19 by screws 29 with a bearing sleeve 30 positioned within the post. A boss 31 is attached to the lever 27 by a screw 32, with the boss rotating in the sleeve 30. A pulley 33 is mounted on the lever 27 by a screw 34, and cable anchors 35 are also mounted on the lever 27 by screws 36. A plurality of openings 37 are provided along the lever 27, to permit mounting the pulley 33 and the anchors 35 in various positions.

Pulleys 38 and 39 are similarly mounted on the aluminum sheet 19, with a plurality of openings 40 in the sheet to provide for various locations for the pulleys. A spring 43 is connected at one end to the frame by a hook 44, with a connector means such as cable 45 connected at the other end of the spring. The cable 45 is wound over the pulley 38 and the pulley 39 and is anchored to the lever 27 at the anchors 35. If desired, a damper unit, such as a hydraulic or pneumatic device 47, may be connected to the lever 27, as by attaching the cylinder of the device to a bracket 48 carried on the sheet 19 and attaching the piston rod 49 to the lever 27 by a bolt 50.

Figure 7:
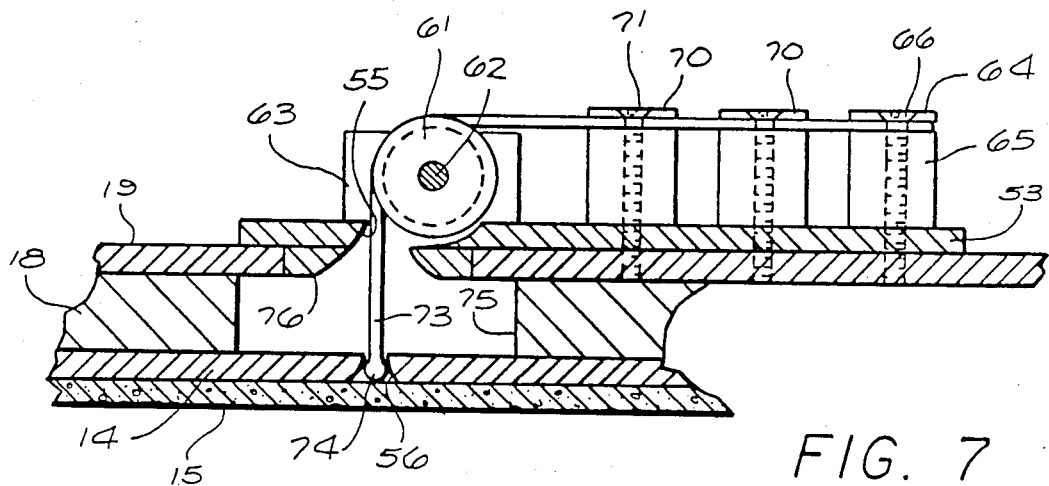
FIG. 7 is an enlarged partial sectional view taken along the line 7—7 of FIG. 3.

A support plate 53 is attached to the sheet 19 by screws 54 with an opening 55 in the support plate aligned with an opening 56 in the base plate 14, as best seen in FIG. 7. An arcuate row of openings 57 and another arcuate row of openings 58 are provided in the sheet 19 to permit the support plate 53 to be positioned at various locations on the sheet 19 while maintaining the alignment of the openings 55, 56. The ability to position the support plate 53 in various locations provides a different curve for the dynamics of the spring load on the isolator. A pulley 61 is mounted on a shaft 62 between blocks 63 on the plate 53, and another pulley 64 is mounted on a post 65 attached to the support plate 53 by screw 66.

Cable anchors 70 are attached to the support plate 53 by screws 71. A cable 73, serving as another connector means, has an enlarged end 74 for anchoring the cable in the opening 56 of the base plate 14. The cable passes upward through a clearance opening 75 in the sheet 18, a tapered opening in an insert 76 in the sheet 19, through the opening 55 and around the pulleys 61, 64 and 33 to the cable anchors 70.

The isolator is shown in the rest position in FIGS. 1 and 3. The spring 43 and cable 45 have moved the lever 27 counter-clockwise, applying a tension in the cable 73 which in turn moves the frame 16 over the base plate 14 to center the frame on the base plate with the openings 55,56 in vertical alignment.

Figure 5:
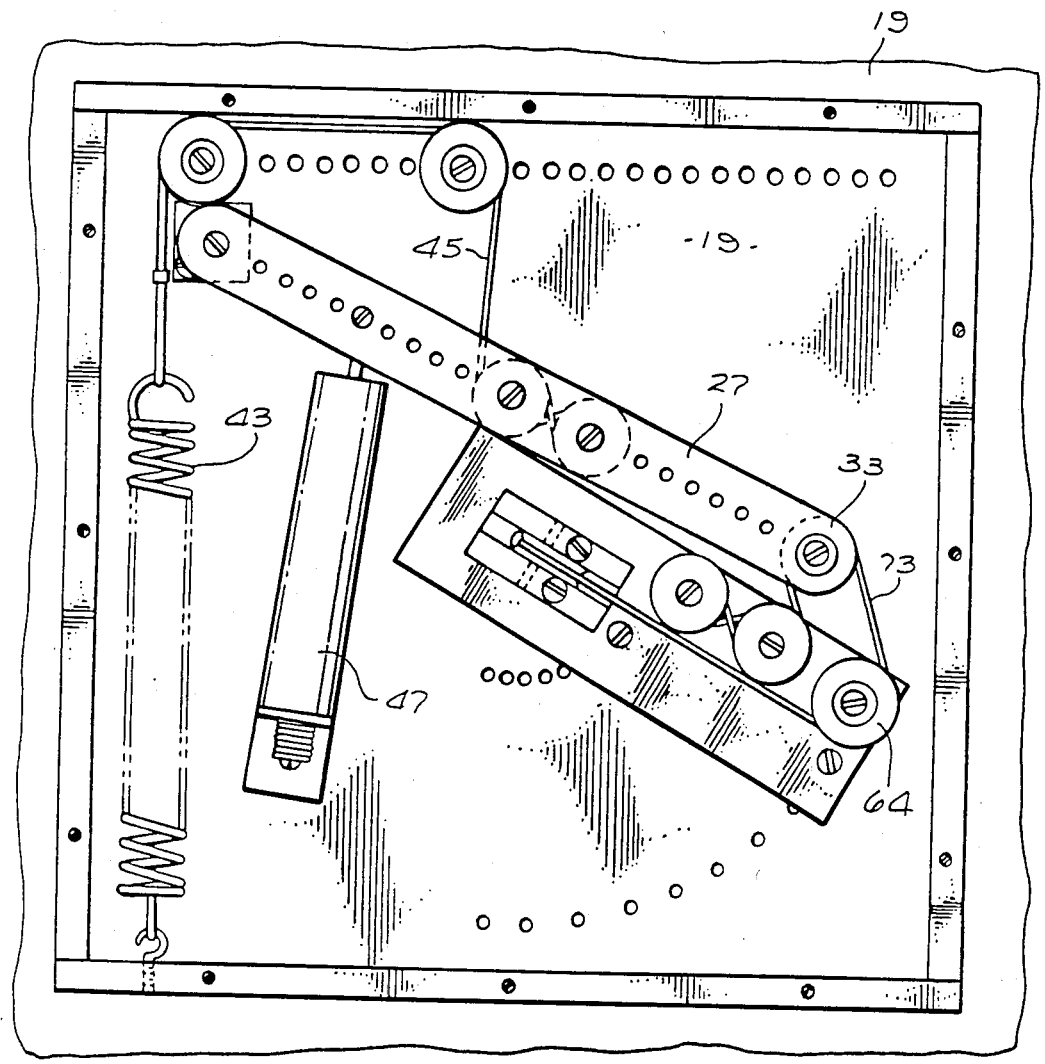
FIG. 5 is an enlarged sectional view taken along the line 5—5 of FIG. 4.

The operation of the apparatus with an earth movement is shown in FIGS. 4 and 5. In FIG. 4, the foundation 15 and base plate 14 have moved to the right with respect to the frame 16 and object 11. The length of cable between the cable end 74 and the pulley 61 has increased, as seen in FIG. 4, which reduces the length of the cable between the pulley 64 and the pulley 33, causing the lever 27 to move in a clockwise direction. The lever movement extends the spring 43, as seen in FIG. 5. This operation has substantially isolated the object from the earth movement. The spring 43 now functions to restore the isolator to the rest position, applying a tension in the cable 45 urging the lever 27 counterclockwise. This lever motion produces a tension in the cable 73 which pulls the frame to the right over the base plate, returning the frame and object to the rest position as shown in FIGS. 1 and 3.

Figure 10:
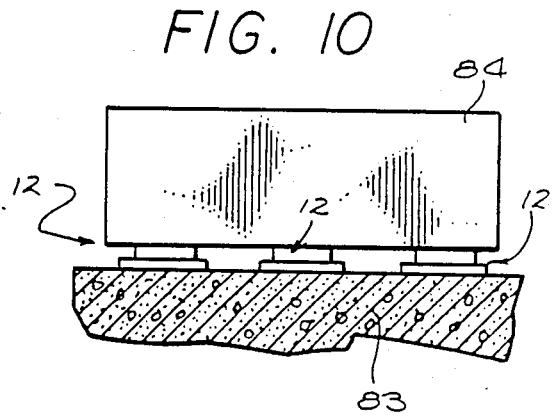
FIGS. 9 and 10 are views similar to that of FIG. 8 showing other alternative embodiments of the invention as used with a room or building.
Figure 8:
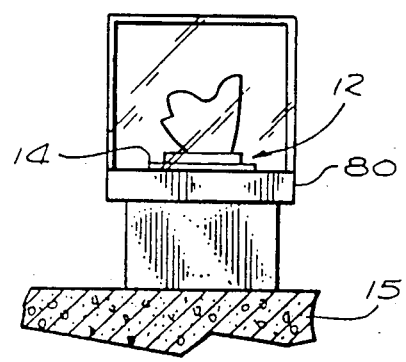
FIG. 8 is a reduced view similar to that of FIG. 1 showing an alternative embodiment of the invention used with a display case.
Figure 9:
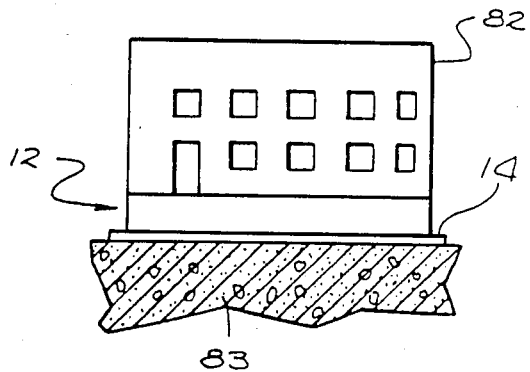

The embodiment of FIGS. 1-7 shows the isolator mounted on a floor with a single object carried on the isolator. Alternatively, an entire display case or other structure could be carried on the frame of the isolator. In the arrangement as shown in FIG. 8, the isolator 12 is mounted in a display case 80 which in turn rests on the floor 15. Another alternative use is shown in FIG. 9, where an entire structure such as a housing 82 is supported on the frame of the isolator, with the base plate resting directly on the earth as indicated at 83. In the alternative of FIG. 10, a plurality of the isolators 12 is used to support a structure 84, which may be a room or a building, on the earth 83. The number and positioning of the isolators may be selected depending on the size and shape of the structure being supported.

I claim:

1. In an apparatus for supporting an object on a base for isolating the object from movement of the base, the combination of:
    a base plate for attachment to a base;
    a frame positioned on said base plate, said base plate and frame having interengaging means providing for omni-directional movement of said frame over said base plate, said frame including support means for mounting an object thereon;
    a moving member mounted on said frame;
    a spring means mounted at one end on said frame;
    first connector means interconnecting the other end of said spring means and said moving member, with said spring means urging said moving member in a first direction to a rest position; and
    second connector means interconnecting said base plate and said moving member for moving said moving member in an opposite direction as said base plate moves relative to said frame away from said rest position, with said spring means through said first connector means, moving member and second connector means urging said frame to said rest position.

2. An apparatus as defined in claim 1 wherein said interengaging means includes a first sliding surface carried on said base plate and a second sliding surface carried on said frame.

3. An apparatus as defined in claim 2 including a damper unit connected between said frame and said moving member for damping movement of said moving member.

4. An apparatus as defined in claim 1 wherein said moving member is a lever pivotally mounted adjacent one end on said frame and including means for coupling each of said first and second connector means to said lever.

5. An apparatus as defined in claim 4 wherein said first connector means includes a first cable and said second connector means includes a second cable.

6. An apparatus as defined in claim 5 wherein said second cable is connected at one end to said base plate and at the other end to said frame, and including:
   first and second cable guide means on said frame and third cable guide means on said moving member, with said second cable running from said base plate around said first, second and third guide means to said frame.

7. An apparatus as defined in claim 6 wherein said first cable is connected at one end to said spring means and at the other end to said moving member, and including additional cable guide means on said frame, with said first cable running from said spring around said additional cable guide means to said moving member.

8. An apparatus as defined in any of claims 1-7 wherein said base plate is adapted for mounting directly on a floor of a building and the object is an art object on display.

9. An apparatus as defined in any of claims 1-7 wherein said base plate is adapted for mounting directly on a floor of a building and the object is a display case.

10. An apparatus as defined in any one of claims 1-7 wherein said base plate is adapted for mounting directly on an earth foundation and the object is a housing.

* * * * *